(12) United States Patent
Geng et al.

(10) Patent No.: US 11,095,142 B2
(45) Date of Patent: Aug. 17, 2021

(54) POWER TOOL SYSTEM AND METHOD FOR CONTROLLING POWER TOOL SYSTEM

(71) Applicant: Nanjing Chervon Industry Co., Ltd., Nanjing (CN)

(72) Inventors: Zheng Geng, Nanjing (CN); Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 367 days.

(21) Appl. No.: 16/284,480

(22) Filed: Feb. 25, 2019

(65) Prior Publication Data
US 2019/0190303 A1 Jun. 20, 2019

Related U.S. Application Data

(63) Continuation of application No. PCT/CN2017/101104, filed on Sep. 8, 2017.

(30) Foreign Application Priority Data

Sep. 13, 2016 (CN) .......................... 201610821999.5

(51) Int. Cl.
*H02J 7/00* (2006.01)
*H01M 10/48* (2006.01)
(Continued)

(52) U.S. Cl.
CPC ............ *H02J 7/00716* (2020.01); *B25F 5/00* (2013.01); *H01M 10/48* (2013.01); *H02J 7/0026* (2013.01); *H02J 7/0029* (2013.01); *H02J 7/00036* (2020.01); *H02J 7/0078* (2013.01); *H02J 50/80* (2016.02); *H02J 7/0048* (2020.01); *H02J 7/00302* (2020.01)

(58) Field of Classification Search
None
See application file for complete search history.

(56) References Cited

U.S. PATENT DOCUMENTS

2011/0304287 A1 12/2011 Dezhong et al.
2015/0069973 A1* 3/2015 Yoshida ............... B60L 58/21
  320/118
2015/0295422 A1 10/2015 Chen

FOREIGN PATENT DOCUMENTS

CN 1864300 A 11/2006
CN 201048140 Y 4/2008
(Continued)

OTHER PUBLICATIONS

ISA/CN, International Search Report issued on PCT application No. PCT/CN2017/101104, dated Dec. 14, 2017, 2 pages.

*Primary Examiner* — Wyatt P McConnell
(74) *Attorney, Agent, or Firm* — Greenberg Traurig, LLP

(57) ABSTRACT

A battery pack of a power tool includes a plurality of cells connected in series, a controller, which is configured to detect a charge current and/or a discharge current of the plurality of cells, estimate remaining capacity of the plurality of cells at least base on an integral of the charge current and/or the discharge current of the plurality of cells over time and generate or select a power supply capability parameter for limiting power of the power tool at least base on the remaining capacity of the plurality of cells, and a memory, which is configured to store data related to the remaining capacity of the plurality of cells.

17 Claims, 9 Drawing Sheets

(51) Int. Cl.
*H02J 50/80* (2016.01)
*B25F 5/00* (2006.01)

(56) References Cited

FOREIGN PATENT DOCUMENTS

| CN | 104145398 A | 11/2014 |
|----|-------------|---------|
| CN | 105227013 A | 1/2016 |
| CN | 105529505 A | 4/2016 |

\* cited by examiner

POWER TOOL SYSTEM AND METHOD FOR CONTROLLING POWER TOOL SYSTEM

TECHNICAL FIELD

The present disclosure relates to a power tool system and a method for controlling the power tool system.

BACKGROUND

With the development of battery technology, the energy density of the battery is gradually increasing, enabling a battery pack to have stronger power supply capability than before.

Compared with the engine-driven power tool which uses fuel as a source of energy, the cordless power tool with a battery pack is cleaner and more environmentally friendly.

Compared with the AC power tool which uses the AC grid as a source of energy, the cordless power tool with a battery pack is more user-friendly, so that users may use it without being limited by sites.

In order to improve the performance of the cordless power tool with the battery pack, a considerable number of cells are often arranged in the battery pack. If the cells in the battery pack cannot be effectively managed during a charging or discharging process to avoid overcharge or over discharge, security risks may arise. At the same time, too conservative security management may prevent the cells from working effectively.

SUMMARY

A battery pack of a power tool includes a plurality of cells connected in series, a controller, which is configured to detect a charge current and/or a discharge current of the plurality of cells, estimate remaining capacity of the plurality of cells at least base on an integral of the charge current and/or the discharge current of the plurality of cells over time and generate or select a power supply capability parameter for limiting power of the power tool at least based on the remaining capacity of the plurality of cells, and a memory, which is configured to store data related to the remaining capacity of the plurality of cells.

Another battery pack of a power tool includes a plurality of cells connected in series, a controller, which is configured to detect a charge current and/or a discharge current of the plurality of cells, estimate remaining capacity of the battery pack at least based on an integral of the charge current and/or the discharge current of the plurality of cells over time, estimate a ratio of the remaining capacity of the battery pack to rated capacity of the battery pack at least based on the remaining capacity of the battery pack and generate or select a power supply capability parameter for limiting power of the power tool at least based on the ratio of the remaining capacity of the battery pack to the rated capacity of the battery pack, and a memory, which is configured to store data related to the remaining capacity of the battery pack and data related to a percentage of the remaining capacity of the battery pack and the rated capacity of the battery pack.

Another battery pack of a power tool includes a plurality of cells connected in series, and a controller, which is configured to detect a charge current and/or a discharge current of the plurality of cells, estimate remaining capacity of the battery pack at least based on an integral of the charge current and/or the discharge current of the plurality of cells over time, estimate recoverable capacity of the battery pack, where the recoverable capacity equals an integral of the charge current of the plurality of cells and the time in a complete charging process or an integral of the discharge current of the plurality of cells and the time in a complete discharging process, estimate a ratio of the remaining capacity of the battery pack to the recoverable capacity of the battery pack at least based on the remaining capacity of the battery pack and the recoverable capacity of the battery pack and generate or select a power supply capability parameter representing power supply capability of the battery pack at least based on the ratio of the remaining capacity of the battery pack to the recoverable capacity of the battery pack.

Another battery pack of a power tool includes a plurality of cells connected in series, a controller, which is configured to detect a voltage of the plurality of cells, detect a charge current and/or a discharge current of the plurality of cells, estimate remaining capacity of the plurality of cells at least based on an integral of the charge current and/or the discharge current of the plurality of cells over time and generate or select a power supply capability parameter for limiting power of the power tool at least based on the voltage and the remaining capacity of the plurality of cells, and a memory, which is configured to store data related to the remaining capacity of the plurality of cells.

Another battery pack of a power tool includes a plurality of cells connected in series, a temperature sensor, which is configured to detect temperature of the plurality of cells, a controller, which is configured to detecting a charge current and/or a discharge current of the plurality of cells, estimate remaining capacity of the plurality of cells at least based on an integral of the charge current and/or the discharge current of the plurality of cells over time and generate or select a power supply capability parameter for limiting power of the power tool at least based on the temperature and the remaining capacity of the plurality of cells, and a memory, which is configured to store data related to the remaining capacity of the plurality of cells.

Another battery pack of a power tool includes a plurality of cells connected in series, a controller, which is configured to detect and estimate an internal resistance of the plurality of cells, or generate or select a parameter representing the internal resistance of the plurality of cells, estimate remaining capacity of the plurality of cells at least based on an integral of a charge current and/or a discharge current of the plurality of cells over time, and generate or select a power supply capability parameter for limiting power of the power tool at least based on the internal resistance and the remaining capacity of the plurality of cells, and a memory, which is configured to store data related to the remaining capacity of the plurality of cells and data related to the internal resistance of the plurality of cells.

Another battery pack of a power tool includes a plurality of cells connected in series, a controller, which is configured to detect a charge current and/or a discharge current of the plurality of cells, estimate remaining capacity of the plurality of cells at least based on the charge current and/or discharge current of the plurality of cells over time and generate or select a power supply capability parameter for limiting a discharge current of the power tool at least based on the discharge current and the remaining capacity of the plurality of cells, and a memory, which is configured to store data related to the remaining capacity of the plurality of cells.

Another battery pack of a power tool includes a plurality of cells connected in series, a temperature sensor, which is configured to detect temperature of the plurality of cells, a controller, which is configured to detect a voltage of the plurality of cells, detect a charge current and/or a discharge current of the plurality of cells, detect and estimate an internal resistance of the plurality of cells, or generate or select a parameter representing the internal resistance of the plurality of cells, estimate remaining capacity of the plurality of cells at least based on an integral of the charge current and/or the discharge current of the plurality of cells over time and generate or select a power supply capability parameter for representing power supply capability of the battery pack at least based on the voltage, the internal resistance, the temperature, the discharge current and the remaining capacity of the plurality of cells, and a memory, which is configured to store data related to the plurality of cells.

Another battery pack of a power tool includes a plurality of cells connected in series, a temperature sensor, which is configured to detect temperature of the plurality of cells, a controller, which is configured to detect a voltage of the plurality of cells, detect a charge current and/or a discharge current of the plurality of cells, detect and estimate an internal resistance of the plurality of cells, or generating or select a parameter representing the internal resistance of the plurality of cells, estimate remaining capacity of the plurality of cells at least based on an integral of the charge current and/or the discharge current of the plurality of cells over time, estimate a ratio of remaining capacity of the battery pack to rated capacity of the battery pack at least based on the remaining capacity of the battery pack and generate or select a power supply capability parameter for representing power supply capability of the battery pack at least based on the voltage, the internal resistance, the ratio of the remaining capacity to the rated capacity, the temperature and the discharge current of the plurality of cells, and a memory, which is configured to store data related to the plurality of cells.

Another battery pack of a power tool includes a plurality of cells connected in series, a temperature sensor, which is configured to detect temperature of the plurality of cells, a controller, which is configured to detect a voltage of the plurality of cells, detect a charge current and/or a discharge current of the plurality of cells, detect and estimate an internal resistance of the plurality of cells, or generate or select a parameter representing the internal resistance of the plurality of cells, estimate remaining capacity of the plurality of cells at least based on an integral of the charge current and/or the discharge current of the plurality of cells over time, estimate a ratio of the remaining capacity of the plurality of cells to recoverable capacity of the plurality of cells at least based on the remaining capacity of the plurality of cells, where the recoverable capacity equals to a charge capacity of the plurality of cells in a complete charging process or a discharge capacity of the plurality of cells in a complete discharging process and generate or select a power supply capability parameter for limiting a discharge current of the power tool at least based on the voltage, the internal resistance, the ratio of the remaining capacity to the recoverable capacity, the temperature and the discharge current of the plurality of cells; and a memory, which is configured to store data related to the plurality of cells.

A power tool includes a tool host and a battery pack as described above.

A method for controlling a discharge current of a power tool having a battery pack includes detecting a charge current and/or a discharge current of the battery pack, estimating remaining capacity of the battery pack at least based on an integral of the charge current and/or the discharge current of the battery pack over time, generating or selecting a power supply capability parameter for limiting power of the power tool at least based on the remaining capacity of the battery pack, and controlling the discharge current of the power tool below a set value corresponding to the power supply capability parameter based on the power supply capability parameter.

A battery pack of a power tool includes a plurality of cells connected in series, a controller, which is configured to detect a charge current and/or a discharge current of the plurality of cells, estimate charge capacity of the battery pack at least based on an integral of the charge current of the plurality of cells over time, select a charge-discharge coefficient related to the discharge current of the plurality of cells at least based on the discharge current of the plurality of cells, estimate dischargeable capacity of the battery pack based on the charge capacity and the charge-discharge coefficient and estimate a power supply capability parameter of the battery pack based on the dischargeable capacity, and a memory, which is configured to store data of the charge-discharge coefficient and data of a correspondence between the charge-discharge coefficient and the discharge current.

Another battery pack of a power tool includes a plurality of cells connected in series, a controller, which is configured to detect a charge current and/or a discharge current of the plurality of cells, estimate charge capacity of the battery pack at least based on an integral of the charge current of the plurality of cells over time, select a charge-discharge coefficient related to the discharge current of the plurality of cells at least based on one or more of charge times, discharge times, total charge duration and total discharge duration of the plurality of cells, estimate dischargeable capacity of the battery pack based on the charge capacity and the charge-discharge coefficient and estimate a power supply capability parameter of the battery pack based on the dischargeable capacity, and a memory, which is configured to store data of the charge-discharge coefficient and data of a correspondence between the charge-discharge coefficient and one or more of the charge times, the discharge times, the total charge duration and the total discharge duration.

Another battery pack of a power tool includes a plurality of cells connected in series, a controller, which is configured to detect a charge current and/or a discharge current of the plurality of cells, estimate charge capacity of the battery pack at least based on an integral of the charge current of the plurality of cells over time, select a charge-discharge coefficient related to the discharge current of the plurality of cells at least based on temperature of the plurality of cells during discharge, estimate dischargeable capacity of the battery pack based on the charge capacity and the charge-discharge coefficient and estimate a power supply capability parameter of the battery pack based on the dischargeable capacity, and a memory, which is configured to store data of the charge-discharge coefficient and data of a correspondence between the charge-discharge coefficient and the temperature of the plurality of cells.

Another battery pack of a power tool includes a plurality of cells connected in series, a controller, which is configured to detect a charge current and/or a discharge current of the plurality of cells, estimate charge capacity of the battery pack at least based on an integral of the charge current of the plurality of cells over time, select a charge-discharge coefficient related to the discharge current of the plurality of cells at least based on an internal resistance of the plurality of cells during discharging, estimate dischargeable capacity of the battery pack based on the charge capacity and the charge-discharge coefficient and estimate a power supply capability parameter of the battery pack based on the dischargeable capacity; and a memory, which is configured to store data of the charge-discharge coefficient and data of a correspondence between the charge-discharge coefficient and the temperature of the plurality of cells.

Another battery pack of a power tool includes a plurality of cells connected in series, a controller, which is configured to detect a voltage of the plurality of cells, detect a charge current and/or a discharge current of the plurality of cells, estimate remaining capacity of the battery pack at least based on an integral of the charge current and/or the discharge current of the plurality of cells over time and correcting the estimated remaining capacity based on the voltage of the plurality of cells to obtain corrected capacity corresponding to the voltage of the plurality of cells, and a memory, which is configured to store data of a correspondence between the voltage and power of the plurality of cells.

Furthermore, the battery pack may include a timer, which is configured to periodically activate the controller to correct the remaining capacity of the battery pack.

Furthermore, the battery pack may include a timer, which is configured to activate the controller to correct the remaining capacity of the battery pack at a preset moment after the battery pack has been charged.

Another battery pack of a power tool includes a plurality of cells connected in series, a temperature sensor, which is configured to detect temperature of the plurality of cells, a controller, which is configured to detect a voltage of the plurality of cells, detect a charge current and/or a discharge current of the plurality of cells, estimate remaining capacity of the battery pack at least based on an integral of the charge current and/or the discharge current of the plurality of cells over time, and correct remaining capacity of the battery pack based on the voltage of the plurality of cells and the temperature of the plurality of cells, and a memory, which is configured to store data of a correspondence among the voltage of the plurality of cells, the temperature and capacity of the plurality of cells.

Another battery pack of a power tool includes a plurality of cells connected in series, a controller, which is configured to detect a charge current of the plurality of cells and estimate recoverable capacity of the battery pack at least based on an integral of the charge current of the plurality of cells in a complete charging process over time when the battery pack is charged, and a memory, which is configured to store data of the recoverable capacity of the battery pack estimated by the controller.

Another battery pack of a power tool includes a plurality of cells connected in series, a memory, which is configured to store data, and a controller, which is configured to detect a voltage of the plurality of cells, detect a charge current and/or a discharge current of the plurality of cells, estimate remaining capacity of the plurality of cells at least based on an integral of the charge current and/or the discharge current of the plurality of cells over time, write a locking mark into the controller when a slope of the remaining capacity of the plurality of cells is less than a preset slope value, where the locking mark is read by the controller in a next charge or discharge control, and lock the battery pack to disenable the battery pack to be charged or discharged after the locking mark is read.

Another battery pack of a power tool includes a plurality of cells connected in series, a memory, which is configured to store data, and a controller, which is configured to detect a voltage of the plurality of cells, detect a charge current and/or a discharge current of the plurality of cells, estimate remaining capacity of the plurality of cells at least based on an integral of the charge current and/or the discharge current of the plurality of cells over time, write a locking mark into the controller when the remaining capacity of the plurality of cells is less than a preset capacity value, where the locking mark is read by the controller, and lock the battery pack to disenable the battery pack to be discharged after the locking mark is read.

Furthermore, the controller may clear the locking mark in the memory when remaining capacity of the battery pack is greater than the preset capacity value.

A power tool system includes a first battery pack, which includes a plurality of cells connected in series and a first controller which is configured to detect a charge current and/or a discharge current of the plurality of cells of the first battery pack, estimate remaining capacity of the first battery pack at least based on an integral of the charge current and/or the discharge current of the plurality of cells over time and estimate a discharge capability parameter of the first battery pack at least base on the remaining capacity of the first battery pack, a second battery pack, which includes a plurality of cells connected in series and a second controller which is configured to detect a voltage of the plurality of cells of the second battery pack and estimate a maximum discharge current of the second battery pack at least based on the voltage of the plurality of cells, and a tool host, which is adapted to the first battery pack or/and the second battery pack and includes a motor and a tool controller which is configured to communicate with the first controller and control a current of the motor based on the discharge capability parameter of the first battery pack and communicate with the second controller and control the current of the motor based on the maximum discharge current of the second battery pack.

Another power tool system includes a battery pack, which includes a plurality of cells connected in series and a battery pack controller which is configured to detect a voltage of the plurality of cells and/or a voltage of the battery pack, detect a charge current and/or a discharge current of the plurality of cells, estimate remaining capacity of the battery pack at least based on an integral of the charge current and/or the discharge current of the plurality of cells over time, estimate a discharge capability parameter of the battery pack at least based on the remaining capacity of the first battery pack and estimate a maximum discharge current of the battery pack at least based on the voltage of the plurality of cells and/or the voltage of the battery pack, a first tool host, which is adapted to the battery pack and includes a first tool controller which is configured to communicate with the battery pack controller and transmit data of the discharge capability parameter of the battery pack, and control a current of a motor based on the discharge capability parameter of the battery pack, and a second tool host, which is adapted to the battery pack and includes a second tool controller which is configured to communicate with the battery pack controller and transmit data of the voltage of the plurality of cells and/or the voltage of the battery pack and data of the maximum discharge current, and control the current of the motor based on the voltage of the plurality of cells and/or the voltage of the battery pack and the maximum discharge current.

The present disclosure has the advantage of being capable of effectively managing the power of the battery pack during the charging or discharging process, thereby avoiding the overcharge and over discharge of the battery pack and effectively exerting the performance of the battery pack while the safety is ensured.

DETAILED DESCRIPTION

The present disclosure will be described below in detail in conjunction with the accompanying drawings and examples.

Figure 1:
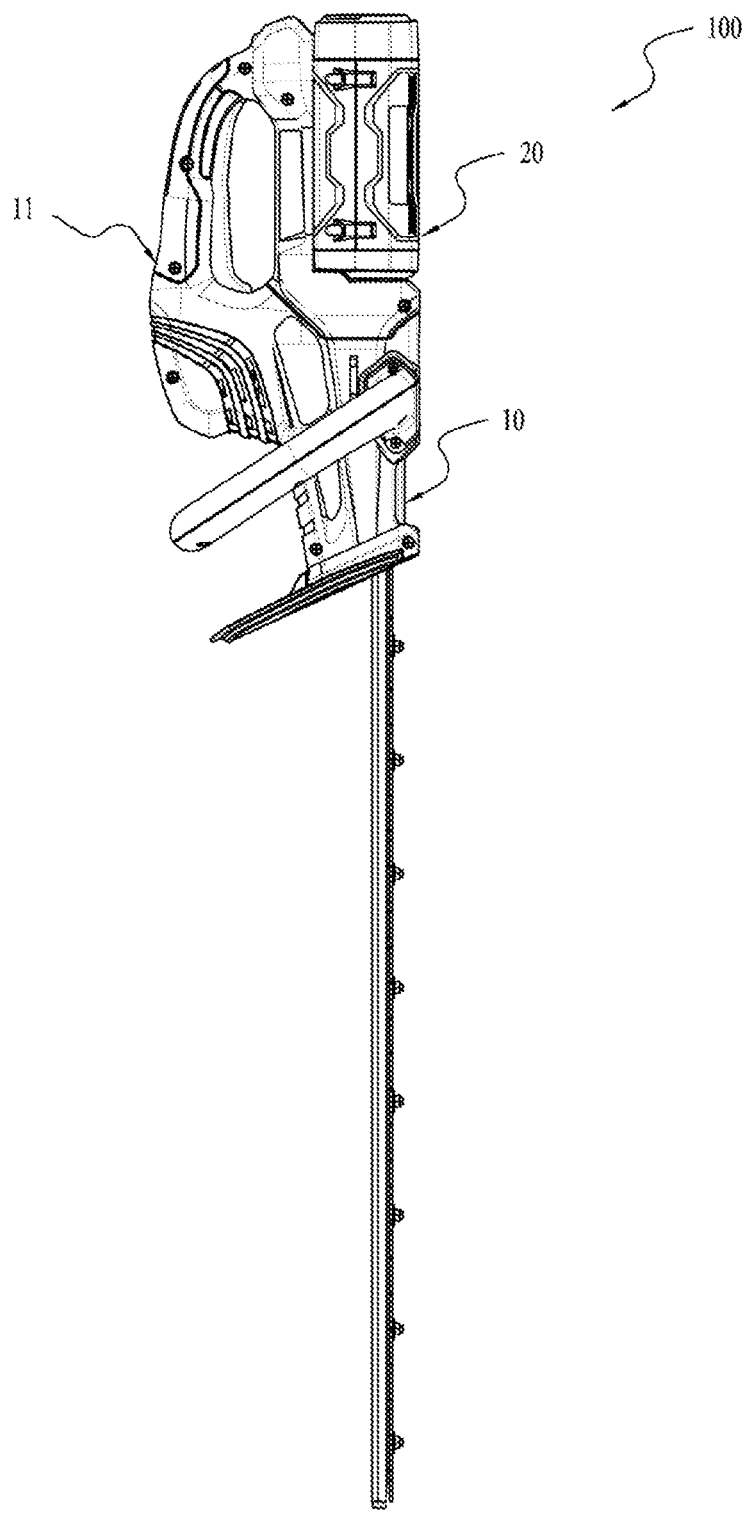
FIG. 1 is a schematic diagram of a power tool according to an example.

As shown in FIG. 1, a power tool 100 includes a tool host 10 and a battery pack 20 for powering the tool host 10.

Figure 2:
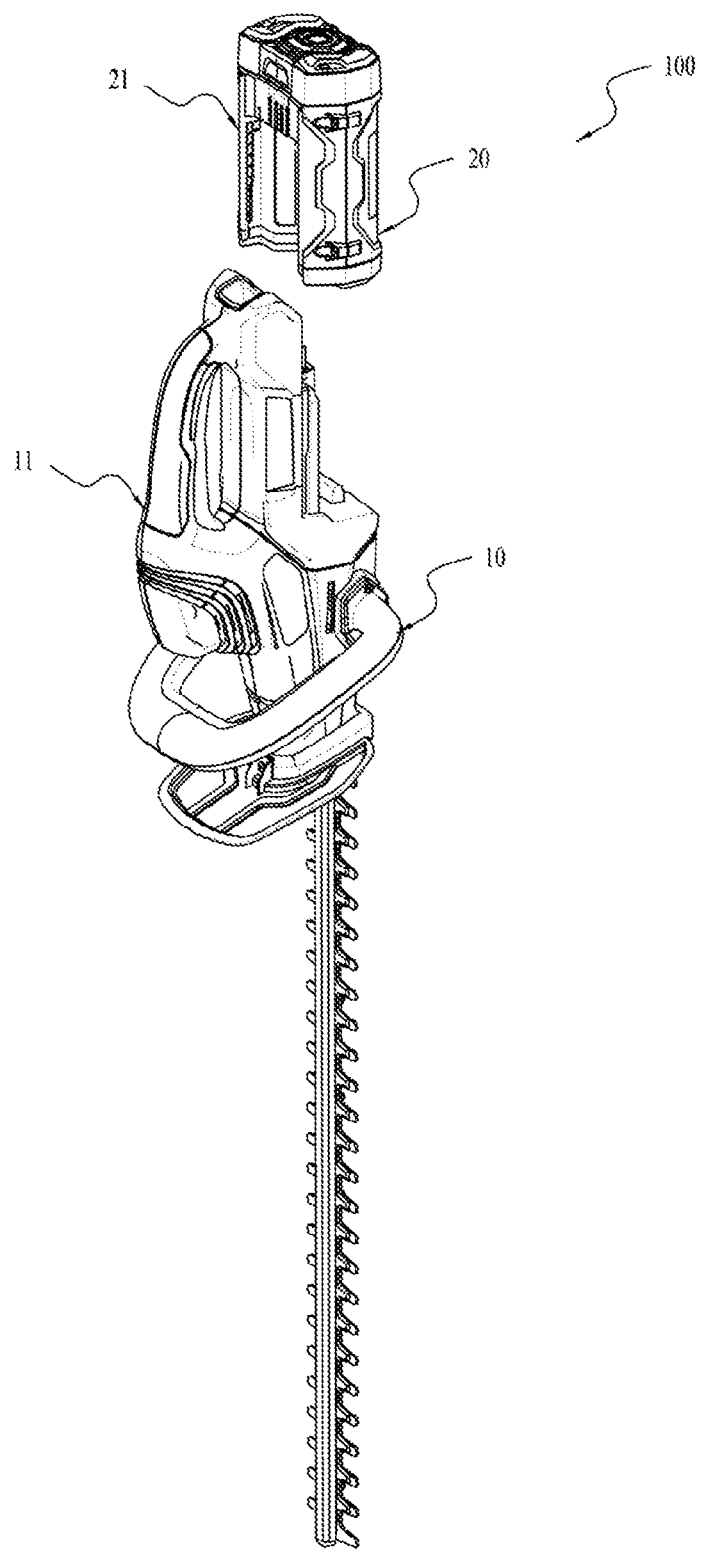
FIG. 2 is a schematic diagram of the power tool illustrated in FIG. 1 when a tool host and a battery pack are separated.

As shown in FIGS. 1 and 2, the battery pack 20 may be detachably connected to the tool host 10 to power the tool host 10. Of course, the battery pack 20 may be detached from the tool host 10 when the battery pack 20 needs to be charged. The tool host 10 includes a tool housing 11. The battery pack 20 includes a battery pack housing 21. When the battery pack 20 is connected to the tool host 10, the tool housing 11 and the battery pack housing 21 fit each other.

Figure 3:
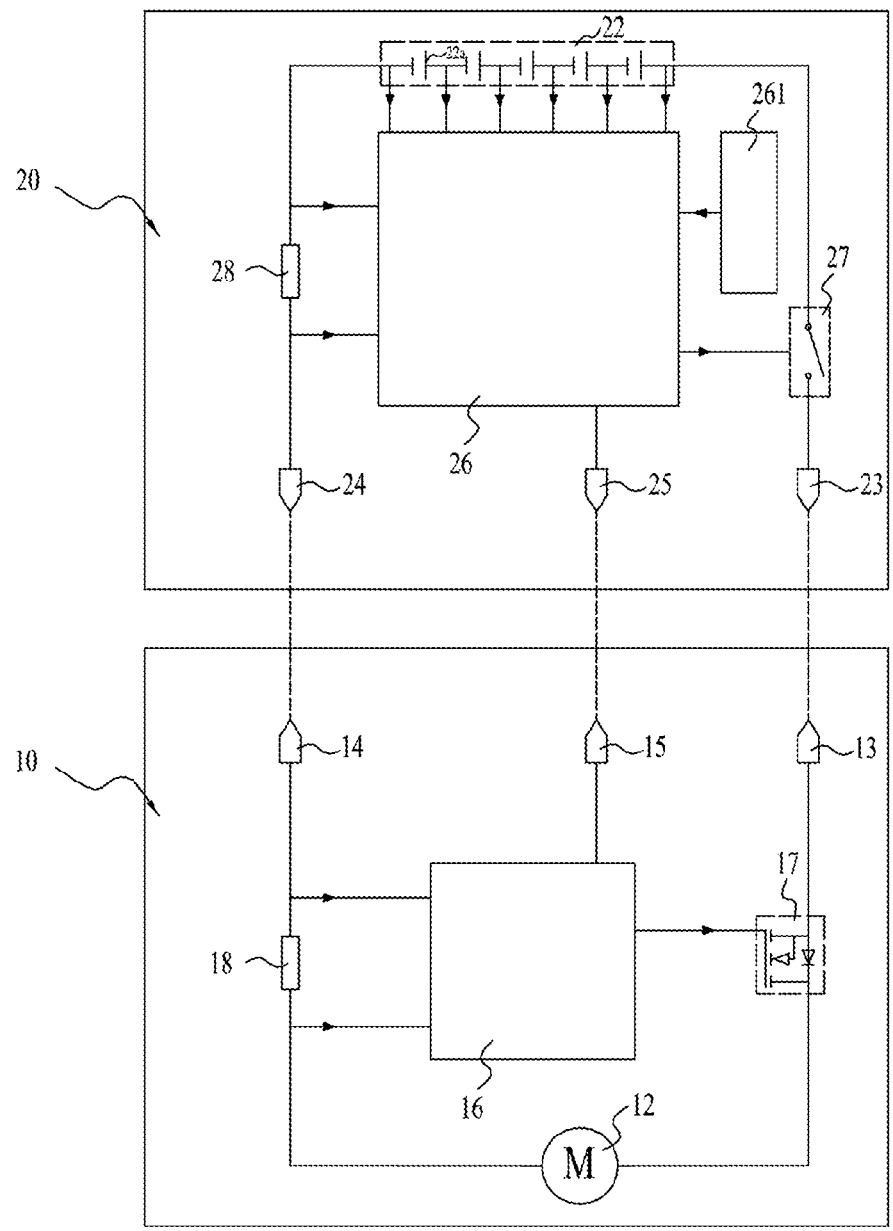
FIG. 3 is a circuit diagram of the power tool illustrated in FIG. 1.

As shown in FIG. 3, the tool host 10 may include an electrical device. In general, the electrical device is a motor 12. The tool host 10 further includes a tool positive terminal 13, a tool negative terminal 14 and a tool communication terminal 15. The tool positive terminal 13 and the tool negative terminal 14 are configured to enable the tool host 10 to access the electric energy of the battery pack 20. The tool communication terminal 15 is configured to implement the data or signal communication between the tool host 10 and the battery pack 20. The tool positive terminal 13 and the tool negative terminal 14 are respectively connected to the motor 12, so that the motor 12 may be driven by the electric energy provided by the battery pack 20.

As shown in FIG. 3, the tool host 10 may further include a tool controller 16 and a current limiting switch 17 controlled by the tool controller 16.

The tool controller 16 is mainly configured to implement detection and control on the tool host 10, such as detecting a current of the motor 12 and storing or running a program for controlling the tool host 10. The tool communication terminal 15 is connected to the tool controller 16. The tool controller 16 may transmit a signal or data to the battery pack 20 via the tool communication terminal 15. Of course, a wireless communication module may be disposed within the tool host 10 to implement a wireless communication between the tool host 10 and the battery pack 20.

The current limiting switch 17 is connected between the tool positive terminal 13 and the motor 12. The current limiting switch 17 may be a MOSFET or other semiconductor switches having similar functions. The current limiting switch 17, driven by an external signal, may turn on or turn off the electrical connection between the motor 12 and the battery pack 20 at a certain duty ratio, thereby limiting the current of the motor 12. The duty ratio for the current limiting switch 17 to turn on or turn off the electrical connection may be determined by a duty ratio of control a signal transmitted by the tool controller 16. Of course, the current limiting switch 17 may be disposed at any other position in the circuit formed by the motor 12 and the battery pack 20.

It is to be noted that if the motor 12 is a brushless motor, the tool controller 16 may comprehensively control a driving circuit of the motor 12 to limit the current. In general, if the motor 12 is a three-phase brushless motor, the drive circuit is a six-arm full-bridge circuit including six MOSFETs. The current limiting switch 17 may be regarded as one arm of the six-arm full-bridge circuits, or the drive circuit may serve as a "current limiting switch" for controlling the current of the motor 12.

In order to enable the tool controller 16 to detect the current flowing through the motor 12, a sampling resistor 18 may be disposed in the tool host 10. The tool controller 16 may detect a current of a circuit in which the sampling resistor 18 is located by detecting a voltage of the sampling resistor 18.

The battery pack 20 includes a cell group 22, and the cell group 22 includes a plurality of cells connected in series, such as cells 22a and 22b. Of course, the battery pack 20 may also be provided with a plurality of cell groups 22 connected in parallel, and each cell group 22 includes a plurality of cells 22a connected in series.

As shown in FIG. 3, in order to input or output electric energy to the cell group 22, the battery pack 20 further includes a battery pack positive terminal 23 and a battery pack negative terminal 24. The battery pack positive terminal 23 is connected to a positive electrode of one cell 22a of the cell group 22. The battery pack negative terminal 24 is connected to a negative electrode of the other cell 22b of the battery pack 22. The cell 22a, the cell 22b and other cells are connected in a series.

As shown in FIG. 3, in order to enable the communication of a signal or data between the battery pack 20 and external devices such as the tool host 10, the battery pack 20 further includes a battery pack communication terminal 25. The battery pack communication terminal 25 may be configured to form a physical connection with the tool communication terminal 15 of the tool host 10 and to transmit an electrical signal via the physical connection, thereby implementing the transmission of the signal and data. Of course, a wireless communication module may be disposed within the battery pack 20, thereby implementing the data transmission by means of wireless communication.

As shown in FIG. 3, the battery pack 20 further includes a battery pack controller 26. The battery pack controller 26 is mainly configured to monitor and manage the state of the battery pack 20, so that the tool host 10 may control the current of the motor based on the actual state of the battery pack 20.

The battery pack controller 26 is capable of processing an input voltage signal or input current signal and is capable of implementing analog-to-digital conversion (ADC) on the signal. At the same time, the battery pack controller 26 may perform calculation and run a program. The battery pack controller 26 may be composed of one MCU chip. Of course, the battery pack controller 26 may further be composed of a plurality of MCUs and a corresponding peripheral circuit.

As shown in FIG. 3, the battery pack 20 further includes a safety switch 27 and a current sensing resistor 28. The safety switch 27 is disposed between the battery pack positive terminal 23 and the battery pack 22. The safety switch 27 may turn on or turn off the connection between the battery pack positive terminal 23 and the cell group 22 under the control of the battery pack controller 26. When the cells of the cell group 22 are overcharged or over discharged or when the cells of the cell group 22 are going to be overcharged or over discharged, the safety switch 27 turns off the connection between the battery pack positive terminal 23 and the cell group 22, thereby disconnecting a charge or discharge circuit to prevent the battery pack 20 from being damaged due to the overcharge or over discharge. Of course, the safety switch 27 may also be disposed between the battery pack negative terminal 24 and the cell group 22, or a plurality of switches capable of disconnecting the discharge or charging circuit may be disposed.

The current sensing resistor 28 is configured to detect a current passing through the cells in the cell group 22. Since the cells in the cell group 22 are connected in series, the current passing through each of the plurality of cells is the same. When the current sensing resistor 28 and the cell group 22 are connected in series, the current passing through the plurality of cells in the cell group 22 is detected by detecting a current passing through the current sensing resistor 28. Of course, when the plurality of cell groups connected in parallel are disposed in the battery pack, a plurality of current sensing resistors should be correspondingly disposed to detect the current respectively passing through each of the plurality of cell groups.

As shown in FIG. 3, the battery pack controller 26 is electrically connected to the current sensing resistor 28 to collect a voltage signal or current signal of the current sensing resistor 28.

The battery pack controller 26 detects a charge current or a discharge current in the cell group 22 (equivalent to a charge current or a discharge current of the cells in the cell group 22) by detecting the voltage signal or the current signal from the current sensing resistor 28, and estimates remaining capacity of the cell group 22 or remaining capacity of the cells in the cell group 22 (if the battery pack has only one cell group, it may also be considered to estimate remaining capacity of the battery pack) based on the detected charge current or discharge current and the duration of the charge current or the discharge current.

For the purpose of a clear description, rated capacity, used capacity, remaining capacity and recoverable capacity are defined first.

The rated capacity is defined as rate electric energy which is stored in a device capable of storing electric energy (such as the battery pack, the cell group and the cell) and which is supplied externally. For example, rated capacity of a battery pack is 2 Ah. It is to be noted that capacity is actually an integral of the current over time, and it should not be considered as different physical quantities in terms of differences in units used to measure the capacity. The same is true to capacity described below.

The used capacity is defined as capacity which is stored in a device capable of storing capacity (such as the battery pack, the cell group and the cells) and which has been used externally. For example, when the rated capacity of a battery pack is 2 Ah, after a period of use, capacity used externally is 0.5 Ah, which means that used capacity of the battery pack is 0.5 Ah.

The remaining capacity is defined as remaining electric energy in a device capable of storing electric energy (such as the battery pack, the cell group and the cells), which still may be supplied externally. For example, when rated capacity of a battery pack is 2 Ah and the battery pack has been charged to the rated capacity, after a period of use, capacity used externally is 0.5 Ah, which means that used capacity of the battery pack is 0.5 Ah, and remaining capacity of the battery pack equals to the rated capacity minus the used capacity, that is 4.5 Ah. In general, the battery pack (the cell group or the cells) is seldom in the state of rated capacity. For example, on the basis of that remaining capacity of a battery pack is 4 Ah before use, after a period of discharge, capacity of 1 Ah is consumed, so remaining capacity of the battery pack at this moment equals the initial remaining capacity of 4 Ah minus the capacity consumed of 1 Ah during this period of discharge, that is 3 Ah. It can be seen that when estimating the remaining capacity of the battery pack (the cell group or the cells), it is insufficient to only obtain capacity change of the battery pack (the cell group or the cells) caused by charging or discharging in a certain period of time. The battery pack controller 26 also needs to obtain capacity (which may be the rated capacity or the remaining capacity) of the battery pack before the current detection and operation.

The recoverable capacity is defined as capacity which can be charged into a device capable of storing electric energy (such as the battery pack, the cell group and the cells) in a complete charging process. After the cells are charged and discharged multiple times, the ability of the cell to store electric energy is reduced, so the battery pack hardly stores as much electric energy as the rated capacity. The complete charging process refers to that when the battery pack is discharged and a voltage of the battery pack or a voltage of the cells in the battery pack is less than a preset value, that is the battery pack is considered to be drained, the battery pack starts to be charged until the voltage of the battery pack or the voltage of the cells in the battery pack is higher than the preset value, that is the battery pack is considered to be fully charged. At this moment, capacity obtained by means of integral operation or product operation based on charge current and charge time is usually less than the rated capacity and the capacity represents the ability of the battery pack to store electric energy. Therefore, the capacity is defined as the recoverable capacity. The battery pack controller 26 may correct the recoverable capacity of the battery pack 20 based on the charge current and charge time of the battery pack 20 during a complete charging process, so that the corrected recoverable capacity may replace the rated capacity of the battery pack 20 for calculation and data processing.

Figure 9:
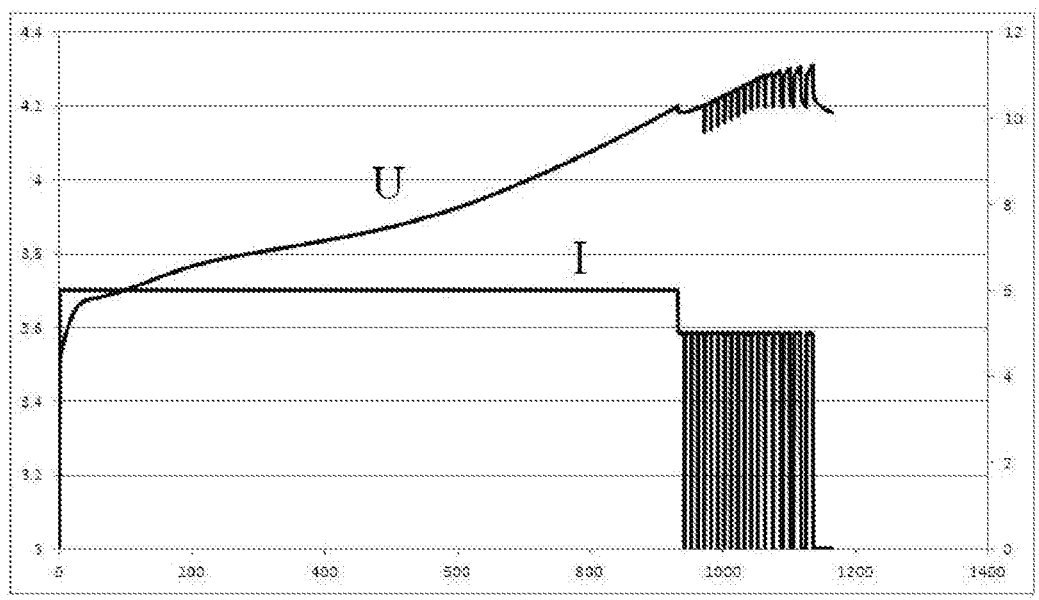
FIG. 9 is a curve graph illustrating charging of a battery pack.

FIG. 9 is a curve graph of charging of a device (such as the battery pack, the cell group and the cells) capable of storing electric energy. In FIG. 9, the horizontal axis represents time in seconds (s), the vertical axis on the left represents the magnitude of the voltage in volts (V), and the vertical axis on the right represents the magnitude of the current in amps (A). In FIG. 9, the battery pack is charged using a constant current-pulsed constant current mode. A complete charging process refers to that when the battery pack is discharged and a voltage of the battery pack or a voltage of the cells in the battery pack is less than a preset value, that is the battery pack is considered to be drained, the battery pack is first charged using a constant current mode until the voltage reaches a switching voltage value and then the battery pack is charged using a pulsed constant current mode until the voltage of the battery pack or the voltage of the cells in the battery pack is higher than the preset value, that is the battery pack is considered to be fully charged. At the moment, the entire charging process completes. Of course, the battery pack may also be charged using a constant voltage-constant current mode or other charging modes.

As shown in FIG. 3, the battery pack 20 further includes a memory 261. The memory 261 is configured to store data related to the remaining capacity of the battery pack, the cell group or the cells. The memory 261 may also be configured to store other programs that the battery pack controller 26 needs to call and read. The memory 261 may be part of the battery pack controller 26, that is, the memory 261 is a storage device disposed within the battery pack controller 26. It is to be noted that when the memory 261 needs to be able to store data when it is not powered.

As shown in FIG. 3, the battery pack controller 26 may estimate remaining capacity of a single cell in the cell group 22 based on detected charge current or the discharge current of the current sensing resistor 28 and time, thereby regenerating or selecting a power supply capability parameter to represent power supply capability of the current cell based on the remaining capacity of the single cell. On the basis of that, the tool controller 16 in the tool host 10 may perform the control function based on the power supply capability parameter, thereby limiting the power consumption of the tool host 10 or/and the discharge current of the battery pack 20. Therefore, the battery pack 20 may be prevented from being over discharged when powering the tool host 10, thereby enabling the battery pack 20 to be used normally.

It is to be noted that the battery pack controller 26 may first estimate the remaining capacity of each single cell and then comprehensively estimate the remaining capacity of the cell group 22 (if the battery pack 20 only has one cell group 22, it is equivalent to estimate the remaining capacity of the battery pack 20). The battery pack controller 26 may also directly estimate the remaining capacity of the entire cell group 20 based on the detected charge current or the discharge current of the current sensing resistor 28 and the time. Since the number of cell groups 22 and the number of cells in each one of the cell groups 22 are known after the battery pack 20 is manufactured, the battery pack controller 26 may directly estimate the remaining capacity of the battery pack 20 based on the detected current and time.

More specifically, the battery pack controller 26 may estimate a ratio of the remaining capacity to the rated capacity of the battery pack 20 based on the remaining capacity of the battery pack 20. Of course, the ratio may be expressed as a percentage. The battery pack controller 26 may then regenerate or select a power supply capability parameter based on the ratio of the remaining capacity to the rated capacity of the battery pack 20.

If considering the power supply capability of the battery pack in an ideal state without taking consideration of the influence of temperature and internal resistance on the power supply capability, the basic factor determining the power supply capability of the battery pack is the remaining capacity of the battery pack. However, the power supply capability of the battery pack may not be fully reflected only based on the remaining capacity of the battery pack. The reason is that the rated capacity of different battery packs is different. Two battery packs with different rated capacity have the same remaining capacity, but for a same tool host, their power supply capability is not the same at this moment. Therefore, in the determination of the power supply capability of the battery pack, it is necessary to first obtain the type of the battery pack, and then determine the power supply capability of the battery pack based on the remaining capacity or the ratio of the remaining capacity to the rated capacity of the battery pack.

For example, one more cell group 22 is connected in parallel into another battery pack 20 than the battery pack 20 shown in FIG. 3. It is obvious that these cell groups are adapted to the same tool host. However, if the power supply capability is estimated based only on the remaining capacity, the power supply capability of this battery pack and the power supply capability of the battery pack 20 shown in FIG. 3 are different event when these two battery packs have the same total remaining capacity.

As shown in FIG. 3, since the cells in the battery pack 22 are all connected in series, the power supply capability of the battery pack is limited by the state of capacity of each cell. The ratio of the remaining capacity to the rated capacity of the battery pack actually reflects the power supply capability of each cell.

As mentioned above, after the cells are charged and discharged a certain number of times, the ability of the cells to store electric energy is attenuated. Therefore, in the battery pack with the corrected recoverable capacity, the battery pack controller 26 uses the ratio of the remaining capacity and the recoverable capacity to generate or select the power supply capability parameter.

The battery pack controller 26 may use some preset calculation formulas to calculate and obtain the power supply capability parameter based on the remaining capacity or the ratio of the remaining capacity to the recoverable capacity (the rated capacity may be considered as the uncorrected recoverable capacity) of the battery pack. The power supply capability parameter calculated in such way is defined as the power supply capability parameter generated by the battery pack controller 26.

The battery pack controller 26 may use some preset programs and databases to call a power supply capability parameter corresponding to the current battery pack condition from the databases based on the remaining capacity or the ratio of the remaining capacity to the recoverable capacity (the rated capacity may be considered as the uncorrected recoverable capacity) of the battery pack as well as a built-in correspondence. The power supply capability parameter called in such way is defined as the power supply capability parameter selected by the battery pack controller 26.

Of course, the battery pack controller 26 may also determine the power supply capability parameter by using a combination of operation and call. This combination may perform at different stages of learning a power supply capability parameter. For example, intermediate data (the ratio of the remaining capacity to the recoverable capacity is also a form of intermediate data) may be first calculated based on the remaining capacity, and then a corresponding power supply capability parameter is selected based on the intermediate data. The combination of operation and call may also perform at different states of the battery pack 20. For example, when the battery pack 20 has a large amount of capacity and its discharge environment is relatively close to a preset state, the battery pack controller 26 may select a suitable discharge capability parameter by means of calling, and when the battery pack 20 has a small amount of capacity and the capacity is sharply decreased, the power supply capability parameter may be determined by means of calculation.

The power supply parameter determined by the battery pack controller 26 is essentially data, which may mean power, current, duty cycle, torque or speed, or may be just a numerical value without any specific meaning.

It is to be noted that the remaining capacity of the battery pack 20 does not necessarily have a one-to-one correspondence with the power supply capability parameter, and the remaining capacity of the battery pack 20 does not necessarily have a linear or any certain function relationship with the power supply capability parameter.

The battery pack controller 26 transmits the power supply capability parameter as data to the tool host 10. The tool controller 16 adjusts or limits the power, current and other performance parameters, which need to match the power supply capability of the battery pack 20, of the tool host 10 at least based on the power supply capability parameter.

A preset power state of the tool host 10 corresponding to a power supply capability parameter allows the tool host 10 to operate only at a power which does not exceed the preset power state. As a result, with the consumption of the remaining capacity of the battery pack 20, the operating power of the tool host 10 is decreasing, disenabling the user to continue to work, so that the user will know that the battery pack 20 needs to be charged. Compared with the prior art in which the power output is disconnected according to the voltage of the battery pack, the present disclosure provides a better user experience, because it avoids the inconvenience caused by the sudden power failure, and avoids the situation in which the electric energy in the battery pack cannot be fully used due to the discrepancy of the voltage drop and the actual remaining capacity.

As a specific scheme, the battery pack controller 26 detects a voltage of each cell in the cell group 22 and uses the voltage of the each cell as the parameter to be considered when generating or selecting the power supply capability parameter. When the battery pack controller 26 estimates the capacity only based on current in the series circuit and time, the situation in which one of the cells connected in series goes wrong or the situation in which part of the cells is imbalanced may not be known based on the remaining capacity. The battery pack controller 26 may generate a power supply capability parameter which is more in line with the actual situation when one of the cells goes wrong or the cells are imbalanced, thereby protecting the cells.

Similarly, the temperature, internal resistance and the voltage of the cells also affect the power supply capability parameter of the battery pack. Therefore, the battery pack controller 26 needs to consider the temperature and internal resistance of the battery core when determining the power supply capability parameter. When determining the power supply capacity parameter during the battery pack discharging process, the battery pack controller 26 also need to consider the discharge current of the cells, because the power supply capability of the cells is also affected when the cells is discharged with a large current.

As shown in FIG. 3, the battery pack 20 further includes a temperature sensor 29. The temperature sensor 29 is configured to detect temperature of the cells.

In addition, according to the actual test, in a case of same voltage difference or when the battery pack is fully charged and then completely drained (going through a complete charging process and a complete discharge process), the amount of electricity charged into the cells and the amount of electricity discharged by the cells are different, and the ratio between them is defined as the charge and discharging coefficient, and the battery pack controller 26 needs to consider the charge-discharge coefficient. When directly estimating the remaining capacity based on the charge capacity, the battery pack controller 26 needs to consider the charge-discharge coefficient, and the charge-discharge coefficient is affected by the discharge current of the cells. The battery pack controller 26 may estimate the amount of actually dischargeable electricity (i.e., the dischargeable capacity) of the battery pack 20 based on the stored database related to charge-discharge coefficient and a correspondence between the charge-discharge coefficient and data such as charge times, discharge times, total charge duration and total discharge duration.

Due to the accuracy of current collection and the operation accuracy of the battery pack controller 26, when the current is large, especially when the electricity is discharged with the large current, the remaining capacity estimated based on the current and time may have an error, so the estimated remaining capacity needs to be corrected. The battery pack controller 26 may periodically correct the remaining capacity of the battery pack by detecting the voltage of the cells or/and detecting a total voltage of the battery pack. The battery pack 20 may be further provided with a timer. The timer is configured to periodically activate the battery pack controller 26 to correct the remaining capacity. Furthermore, when the battery pack is not used for a long time, the self-discharge also makes the actual remaining capacity lower than the estimated remaining capacity.

The relationship between the voltage and the remaining capacity may be stored, and then the remaining capacity obtained by the estimation is replaced by the remaining capacity corresponding to the voltage. This correction is better to be performed when the voltage of the cells is stable.

The remaining capacity may be periodically corrected by using the following three modes.

In a first mode, a program is activated for correcting the remaining capacity and corrects the remaining capacity based on the voltage when the battery pack 20 is stationary for more than a preset value, for example, three hours.

In a second mode, the program is periodically activated for correcting the remaining capacity at a fixed interval, for example, three days.

Of course, the battery pack 20 is no longer discharged after the battery pack 20 is suddenly discharged with a large current, and then the program described above for correcting the remaining capacity is activated after a certain period of time.

When one of the cells connected in the series of the battery pack goes wrong, or when part of the cells is imbalanced, the remaining capacity of the battery pack may be sharply reduced during charging or discharging process. At this moment, in order to protect the battery pack, the battery pack controller 26 may estimate the remaining capacity of the cells at least base on an integral of the charge current and/or the discharge current of the cells over time, write a locking mark into the battery pack controller when a slope of the remaining capacity is less than a preset slope, where the locking mark is read by the batter pack controller in a next charge or discharge control, and lock the battery pack to disenable the battery pack to be charged or discharged after the locking mark is read by the batter pack controller in the next charge or discharge control.

During the discharging process of the battery pack, the battery pack controller 26 detects the voltage and the discharge current of the cells, and estimates the remaining capacity and the slope of the remaining capacity of the cells based on the integral of the discharge current of the cells over time. When the battery pack is discharged, the slope is negative. When the slope of the remaining capacity is less than the preset slope value, the battery pack controller transmits a control signal to the memory, and writes a locking mark in the memory which may be read by the controller in the next charge or discharge control. In this way, when the battery pack is recharged, the battery pack controller locks the battery pack after reading the locking mark to disenable the battery pack to be discharged, thereby protecting the battery pack.

Of course, in another possible implementation, the locking mark described above may also be written into the controller in the tool host to implement the same function. At this moment, the battery pack controller and the controller in the tool host are in wireless or wired communication.

In a case of wireless communication, each of the battery pack and the tool host may be provided with a wireless communication device so that they may communicate with each other.

When the tool host is working, as the remaining capacity of the battery pack is gradually reduced, the battery pack controller writes a locking mark for the battery pack controller to read into the memory when the remaining capacity of the cells in the battery pack is less than a preset capacity value. The battery pack controller locks the battery pack after reading the locking mark to disenable the battery pack to be discharged.

When the remaining capacity of the battery pack is insufficient, the battery pack needs to be charged. During the charging process of the battery pack, the remaining capacity of the battery pack is increased as the charging time increases. When the remaining capacity of the battery pack is greater than the preset capacity value, the battery pack controller clears the locking mark in the memory, so that the battery pack may be discharged to power the tool host.

The preset capacity value of the battery pack during the charging process is greater than a preset capacity value of the battery pack during the discharging process, so as to avoid the influence of the backlash caused by the presence of the locking mark when the battery pack is charged.

The locking mark herein may be a digital signal indicating that the battery pack cannot be charged or discharged. For example, when the remaining capacity of the cells in the battery pack is less than the preset capacity value, the corresponding digital signal 1 is written into the memory, and the battery pack controller locks the battery pack after reading the corresponding digital signal 1 to disenable the battery pack to be discharged. Similarly, when the remaining capacity of the battery pack is less than the preset capacity value, a corresponding digital signal 0 is written into the memory to clear the locking mark in the memory. Of course, the locking mark may also be written into the controller of the tool host or the memory. At this moment, the controller of the tool host or the memory communicates with the battery pack in a wired or wireless manner.

Figure 4:
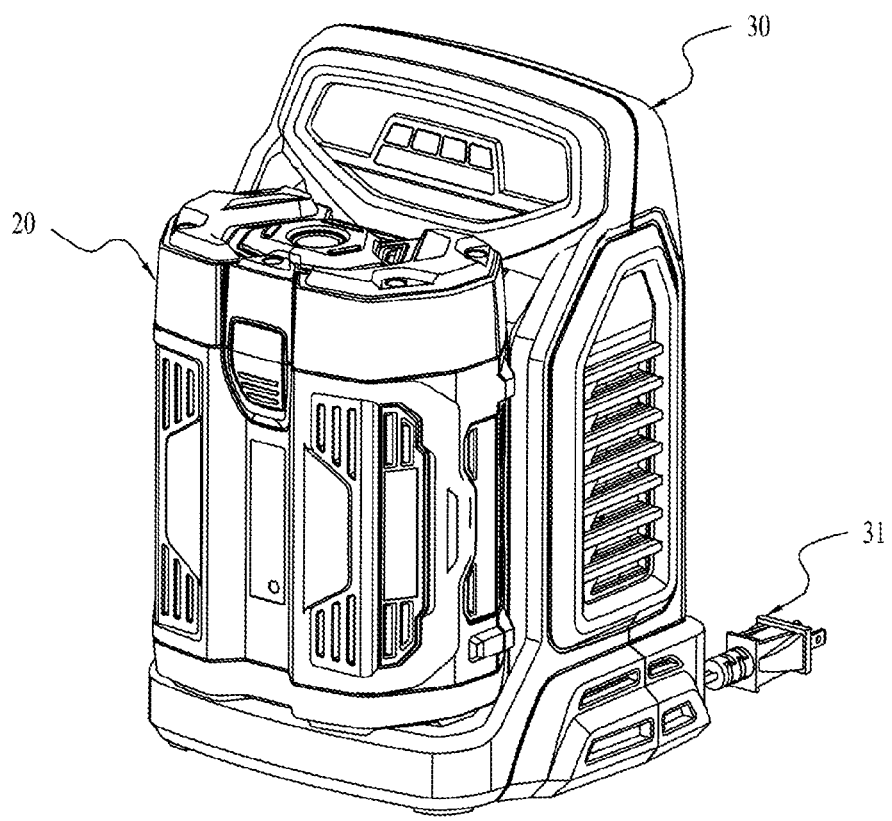
FIG. 4 is a schematic diagram of a charging assembly according to an example.
Figure 5:
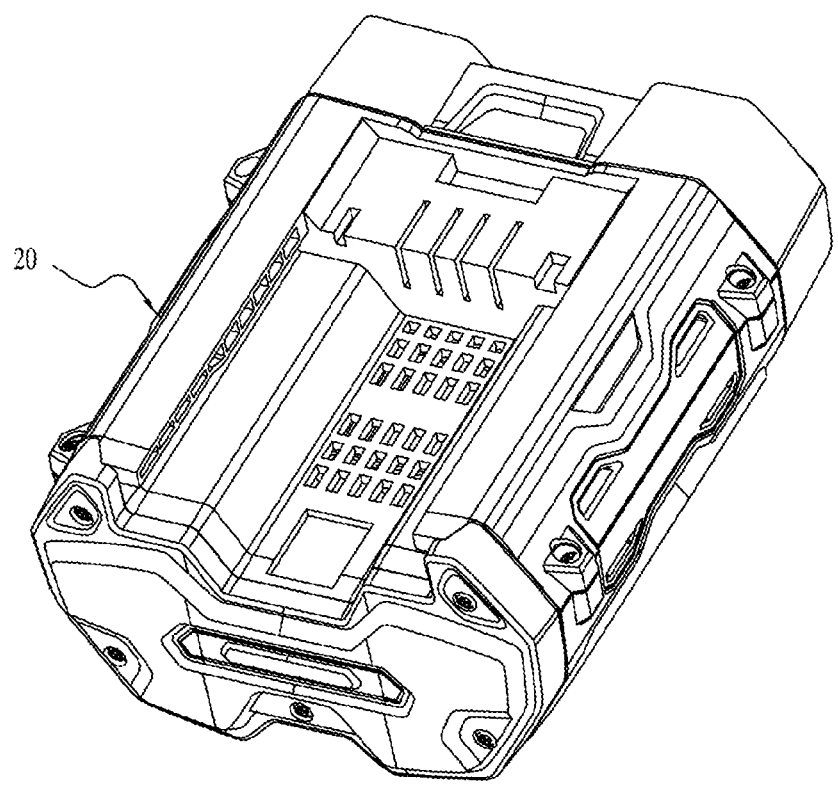
FIG. 5 is a schematic diagram of a battery pack in the charging assembly illustrated in FIG. 4.
Figure 6:
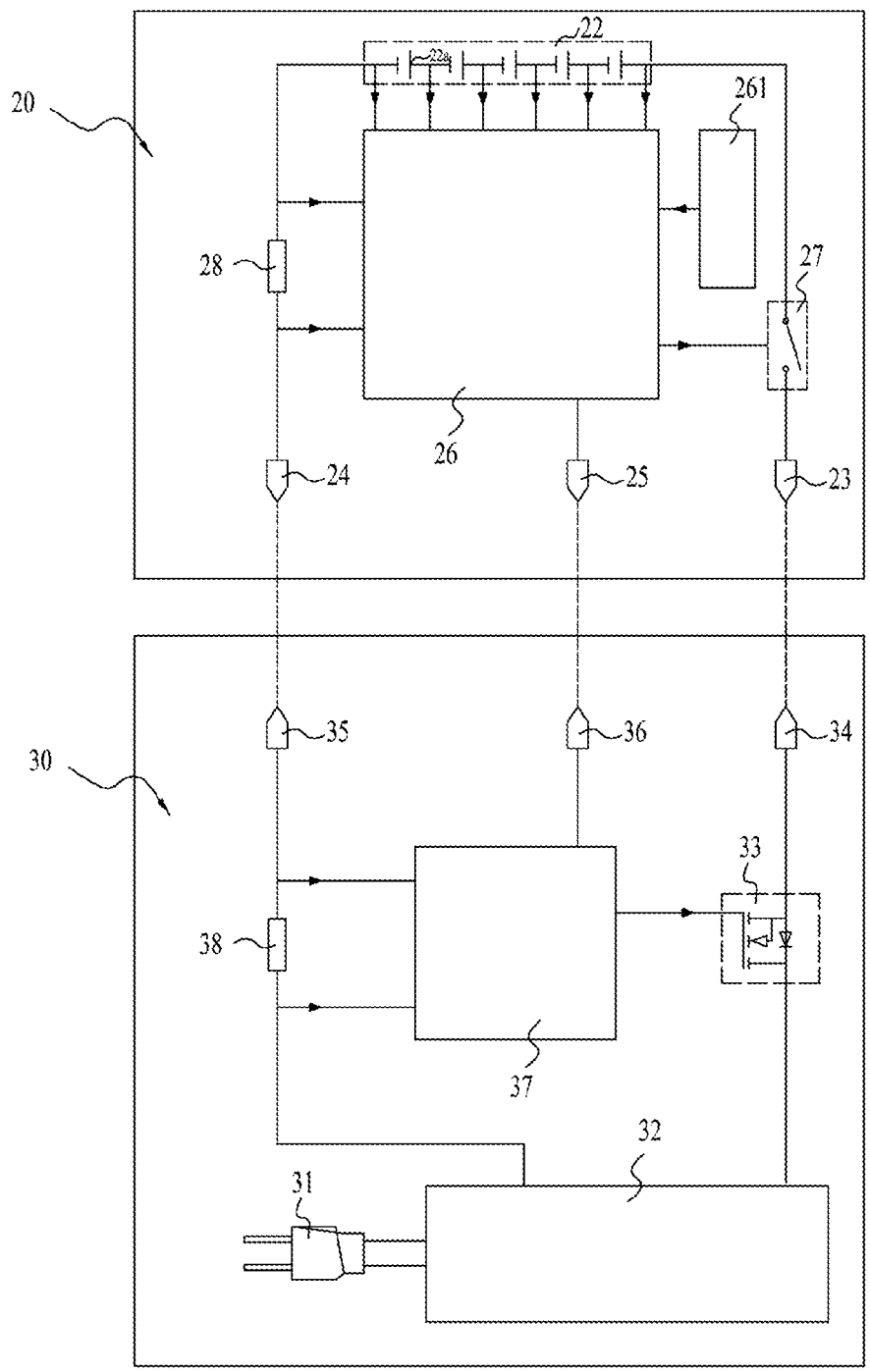
FIG. 6 is a circuit diagram of the charging assembly illustrated in FIG. 4.

As shown in FIGS. 4 to 6, a charging assembly 300 includes the battery pack 20 of the power tool 100 and a charger 30 which is adapted to the battery pack 20.

The battery pack 20 has been described above and is not repeated here. The charger 30 includes an AC power plug 31, an electric energy conversion module 32, a control switch 33, a charger positive terminal 34, a charger negative terminal 35, a charger communication terminal 36, a charger controller 37 and a sensing resistor 38.

The AC power plug 31 is configured to access AC power. The electric energy conversion module 32 converts the AC power accessed via the AC power plug 31 into DC power to charge the battery pack 20. The control switch 33 may be a MOSFET switch or other type of electronic switch, and is mainly configured to control the charge current. The charger controller 37 is at least configured to transmit a control signal to the control switch 33 to enable the control switch 33 to be turned on or turned off at a certain duty ratio. The charger positive terminal 34 is configured to connect the battery pack positive terminal 23 of the battery pack 20. The charger negative terminal 35 is configured to connect the battery pack negative terminal 24 of the battery pack 20. The charger communication terminal 36 is configured to enable the charger controller 37 to perform the external communication.

The charger controller 37 is configured to control the charging process of the charger 30 and perform necessary protection actions, such as detecting a charge current and storing or running a program for controlling the progress of the charger 30. The charge controller 30 may transmit a signal or data to the battery pack 20 through the charger communication terminal 36. Of course, a wireless communication module may also be disposed within the charger 30 to enable the charger 30 to wirelessly communicate with the battery pack 20.

In order to enable the charger controller 37 to detect a charge current of the charger, a sensing resistor 38 may be disposed in the charger 30. The charger controller 37 may detect the charge current by detecting a voltage of the sensing resistor 38.

The battery pack controller 26 may be in a signal or data communication with the charger controller 37 through a connection between the battery pack communication terminal 25 and the charger communication terminal 36, thereby implementing the transmission of the signal and the data. The battery pack controller 26 is mainly configured to detect and manage the state of the battery pack 20, so that the charger controller 37 may control the charge current of the charger 30 according to a real-time state of the battery pack 20.

The battery pack controller 26 may effectively protect the battery pack by using the method described above.

When the battery pack 20 is charged via the charger 30, the battery pack controller 26 detects the charge current of the battery pack, estimates the remaining capacity of the battery pack based on the integral of the charge current of the battery pack over time, and generates or selects a power supply capability parameter for limiting power of the charger based on the remaining capacity of the battery pack. The battery pack controller 26 transmits the power supply capability parameter as data to the charger 30. The charger controller 37 adjusts or limits the power, a current and other performance parameters, which need to match the power supply capability of the battery pack 20, of the charger 30 at least based on the power supply capability parameter.

It will be apparent that the method described above used by the battery pack controller 26 may also be used in the charger controller 37.

Figure 7:
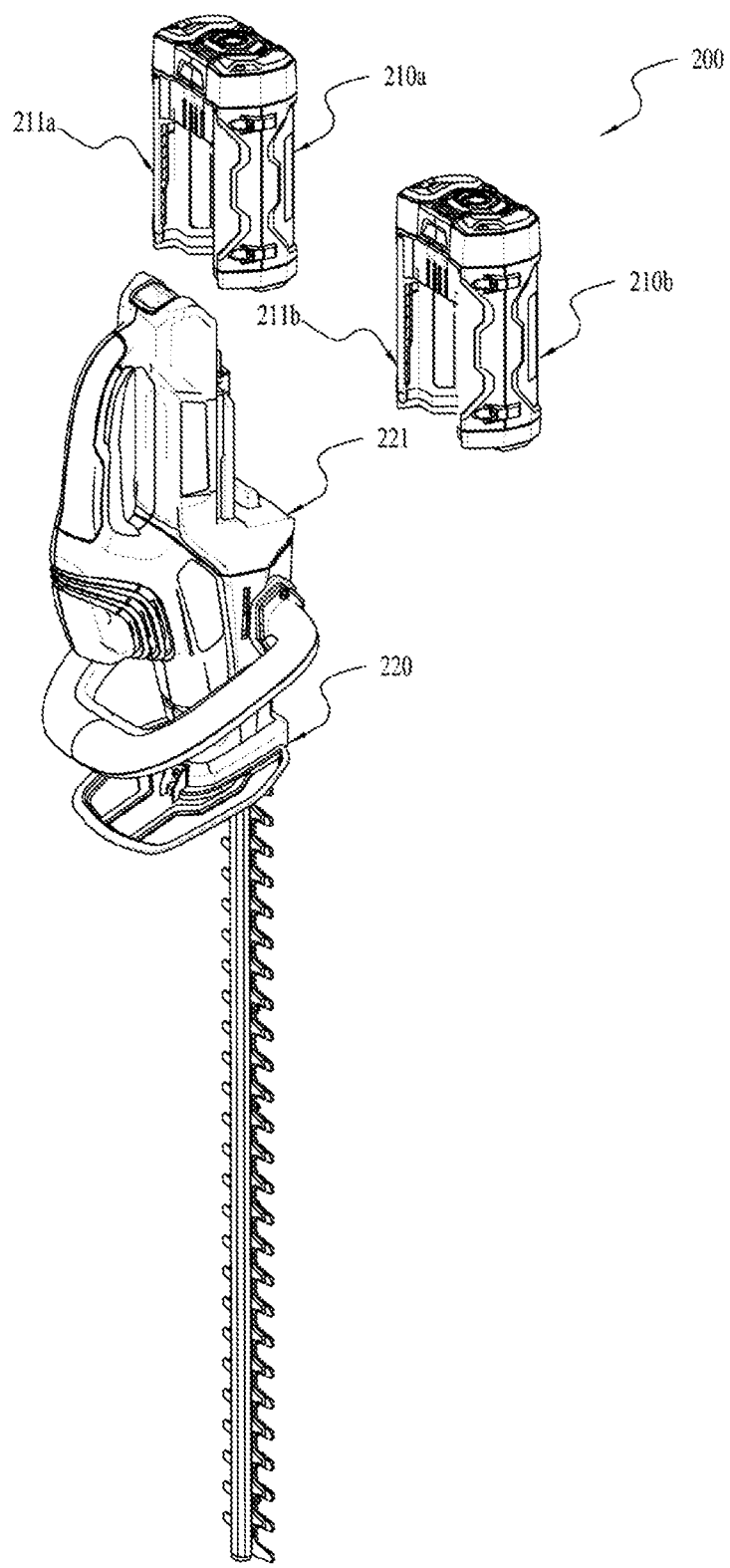
FIG. 7 is a schematic diagram of a power tool system.
Figure 8:
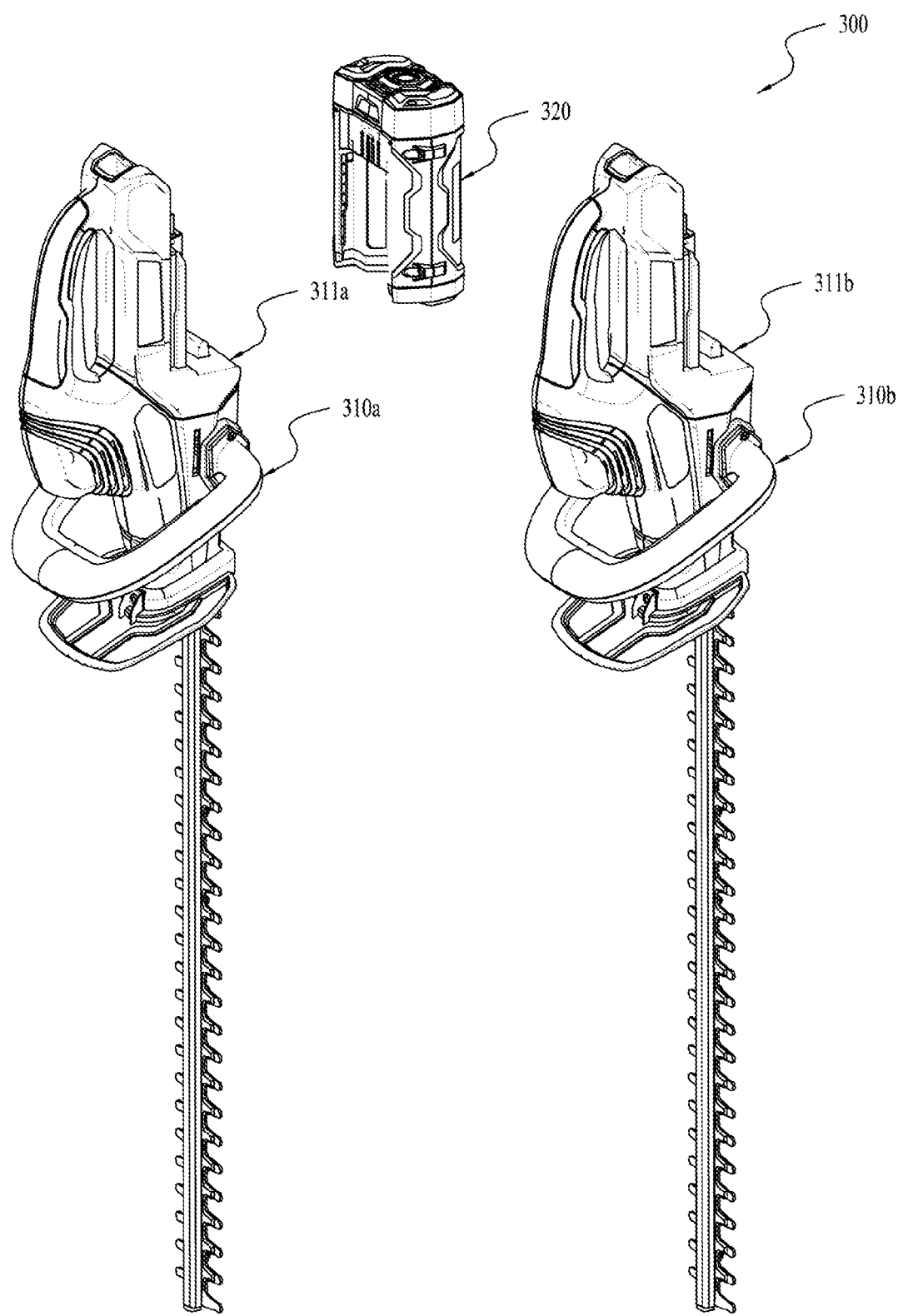
FIG. 8 is a schematic diagram of another power tool system.

As shown in FIG. 7, the power tool system 200 includes a tool host 210, a first battery pack 220a and a second battery pack 220b. The first battery pack 220a and the second battery pack 220b may be detachably connected to the tool host 210 to power the tool host 210, respectively. Of course, the first battery pack 220a and the second battery pack 220b may also be detached from the tool host 210 when these two battery packs need to be charged.

The tool host 210 includes a tool housing 211. The first battery pack 220a includes a first battery pack housing 211a. When the first battery pack 220a is connected to the tool host 210, the tool housing 211 and the first battery pack housing 221a fit each other. The second battery pack 220b includes a second battery pack housing 221b. When the second battery pack 220b is connected to the tool host 210, the tool housing 211 and the second battery pack housing 221b fit each other.

The tool host 210 further includes an electrical device. In general, the electrical device is a motor. The tool host 210 may further include a tool controller. The tool controller is mainly configured to implement the detection and control of the tool host 210. The tool controller communicates with a first controller and controls a current of the motor based on a discharge capability parameter of the first battery pack. The tool controller communicates with a second controller and controls the current of the motor based on the discharge capability parameter of the second battery pack.

The first battery pack 220a includes a plurality of cells connected in series. Of course, the first battery pack 220a may also be provided with a plurality of cell groups connected in parallel, and each cell group includes a plurality of cells connected in series.

The first battery pack 220a further includes a first controller. The first controller is mainly configured to detect and manage the state of the first battery pack 220a, so that the tool host 210 may control the current of the motor based on the actual state of the first battery pack 220a.

The first controller is configured to detect a charge current or/and a discharge current of the cells in the first battery pack, estimate remaining capacity of the first battery pack at least based on an integral of the charge current or/and the discharge current of the cells over time, and estimate a discharge capability parameter of the battery pack at least based on the remaining capacity of the battery pack. On the basis of that, the tool controller in the tool host 210 implements the control according to the discharge capability parameter, thereby limiting the power consumption of the tool host 210 or/and the discharge current of the first battery pack 220a. Therefore, the first battery pack 220a may be prevented from being over discharged when powering the tool host 210, thereby enabling the second battery pack 220b to be used normally.

It is apparent that the first controller may adopt the control scheme described above to protect the first battery pack.

The second battery pack 220b includes a plurality of cells connected in series. Of course, the second battery pack may be further provided with a plurality of cell groups connected in parallel, and each cell group includes a plurality of cells connected in series.

The second battery pack 220b further includes a second controller. The second controller is mainly configured to detect and manage the state of the second battery pack 220b, so that the tool host 210 may control the current of the motor based on the actual state of the second battery pack 220b.

The second controller is configured to detect a voltage of the cells in the second battery pack, and estimate a maximum discharge current of the second battery pack at least based on the detected voltage of the cells, so that the tool controller in the tool host 210 is controlled according to the maximum discharge current. On the basis of that, the power consumption of the tool host 210 or/and a discharge current of the battery pack is limited. Therefore, the second battery pack 220b is prevented from being over discharged when powering the tool host 210, thereby enabling the second battery pack 220b to be used normally.

It is apparent that the second controller may adopt the control scheme described above to protect the second battery pack.

As shown in FIG. 7, the power tool system 300 includes a battery pack 320, a first tool host 310a and a second tool host 310b. The battery pack 320 may be detachably connected to the first tool host 310a or the second tool host 310b to power the first tool host 310a or the second tool host 310b. Of course, the battery pack 320 may also be detached from the first tool host 310a or the second tool host 310b when the battery pack 320 needs to be charged.

The first tool host 310a includes a first tool housing 311a. The second tool host 310b includes a second tool housing 311b. The battery pack 320 includes a battery pack housing 321. When the battery pack 320 is connected to the first tool host 310a, the first tool housing 311a and the battery pack housing 321 fit each other. When the battery pack 320 is connected to the second tool host 310b, the second tool housing 311b and the battery pack housing 321 fit each other.

The battery pack 320 includes a plurality of cells connected in series. Of course, the battery pack may be further provided with a plurality of cell groups connected in parallel, and each cell group includes a plurality of cells connected in series.

The battery pack 320 further includes a battery pack controller. The battery pack controller is mainly configured to detect and manage the state of the battery pack 320. Specifically, the battery pack controller is configured to detect a voltage of the cells and/or a voltage of the battery pack, detect a charge current or/and a discharge current of the cells, estimate remaining capacity of the battery pack at least based on an integral of the discharge current over time, estimate data of a discharge capability parameter of the battery pack at least based on the remaining capacity of the battery pack, and estimate a maximum discharge current of the battery pack at least based on the voltage of the cells and/or the voltage of the battery pack.

The first tool host 310a further includes a first tool controller. The first tool controller is configured to communicate with the batter pack controller, transmit the data of the discharge capability parameter of the battery pack, and control a current of a motor based on the discharge capability parameter of the battery pack. On the basis of that, the power consumption of the first tool host 310a or/and a discharge current of the battery pack is limited. Therefore, the battery pack 320 is prevented from being over discharged when powering the first tool host 310a, thereby enabling the battery pack 320 to be used normally.

The second tool host 310b further includes a second tool controller. The second tool controller is configured to communicate with the battery pack controller, transmit data of the voltage of the cells and/or the voltage of the battery pack and the maximum discharge current of the battery pack, and control the current of the motor based on the voltage of the cells and/or the voltage of the battery pack and the maximum discharge current. On the basis of that, the power consumption of the second tool host 310b or/and the discharge current of the battery pack is limited. Therefore, the battery pack 320 is prevented from being over discharged when powering the second tool host 310d, thereby enabling the battery pack 320 to be used normally.

That is, the method scheme described above used by the battery pack controller may also be used in the first tool controller and the second tool controller.

The above illustrates and describes basic principles, main features and advantages of the present disclosure. It is to be understood by those skilled in the art that the above examples do not limit the claimed invention in any form, and all solutions obtained by means of equivalent substitution or equivalent transformation fall within the protection scope of the claims.

What is claimed is:

1. A battery pack of a power tool, comprising:
   a plurality of cells connected in series;
   a controller configured to:
     detect a charge current and a discharge current of the plurality of cells;
     estimate a charge capacity of the battery pack at least based on an integral of the charge current of the plurality of cells over time;
     select a charge-discharge coefficient related to the discharge current of the plurality of cells at least based on one or more of the discharge current of the plurality of cells, charge times, discharge times, total charge duration, total discharge duration, temperature of the plurality of cells and an internal resistance of the plurality of cells during discharging of the plurality of cells;
estimate dischargeable capacity of the battery pack based on the charge capacity and the charge-discharge coefficient; and
estimate a power supply capability parameter of the battery pack based on the dischargeable capacity; and
a memory configured to store data of the charge-discharge coefficient and data of a correspondence between the charge-discharge coefficient and one or more of the discharge current of the plurality of cells, charge times, the discharge times, the total charge duration and, the total discharge duration, temperature of the plurality of cells and an internal resistance of the plurality of cells during discharging of the plurality of cell.

2. The battery pack according to claim 1, wherein the battery pack further comprises a timer configured to periodically activate the controller to correct a remaining capacity of the battery pack.

3. The battery pack according to claim 1, wherein the battery pack further comprises a timer configured to activate the controller to correct a remaining capacity of the battery pack at a preset moment after the battery pack has been charged.

4. The battery pack according to claim 1, wherein the battery pack further comprises a wireless communication module configured to wirelessly transfer data stored in the memory.

5. The battery pack according to claim 1, wherein the battery pack further comprises a safety switch, disposed between a battery pack positive terminal and the battery pack, configured to turn on or turn off the connection between the battery pack positive terminal and the plurality of cells under the control of the controller.

6. The battery pack according to claim 1, wherein the battery pack further comprises a current sensing resistor configured to detect a current passing through the plurality of cells.

7. A battery pack of a power tool, comprising:
a plurality of cells connected in series;
a memory configured to store data; and
a controller configured to:
detect a voltage of the plurality of cells;
detect a charge current and/or a discharge current of the plurality of cells;
estimate remaining capacity of the plurality of cells at least based on an integral of the charge current and/or the discharge current of the plurality of cells over time;
write a locking mark into the controller when a slope of the remaining capacity of the plurality of cells is less than a preset slope value or the remaining capacity of the plurality of cells is less than a preset capacity value, wherein the locking mark is read by the controller in a next charge or discharge control; and
lock the battery pack to disenable the battery pack to be charged or discharged after the locking mark is read.

8. The battery pack according to claim 7, wherein the controller clears the locking mark in the memory when remaining capacity of the battery pack is greater than the preset capacity value.

9. The battery pack according to claim 7, wherein the battery pack further comprises a timer configured to activate the controller to correct a remaining capacity of the battery pack at a preset moment after the battery pack has been charged.

10. The battery pack according to claim 7, wherein the battery pack further comprises a wireless communication module configured to wirelessly transfer data stored in the memory.

11. The battery pack according to claim 7, wherein the battery pack further comprises a safety switch, disposed between a battery pack positive terminal and the battery pack, configured to turn on or turn off the connection between the battery pack positive terminal and the plurality of cells under the control of the controller.

12. The battery pack according to claim 7, wherein the battery pack further comprises a current sensing resistor configured to detect a current passing through the plurality of cells.

13. A power tool system, comprising:
a battery pack comprising:
a plurality of cells connected in series; and
a battery pack controller configured to:
detect a voltage of the plurality of cells and/or a voltage of the battery pack;
detect a charge current and/or a discharge current of the plurality of cells;
estimate remaining capacity of the battery pack at least based on an integral of the charge current and/or the discharge current of the plurality of cells over time;
estimate a discharge capability parameter of the battery pack at least based on the remaining capacity of the battery pack; and
estimate a maximum discharge current of the battery pack at least based on the voltage of the plurality of cells and/or the voltage of the battery pack;
a first tool host adapted to couple with the battery pack, comprising:
a first tool controller configured to:
communicate with the battery pack controller and transmitting data of the discharge capability parameter of the battery pack; and
control a current of a motor based on the discharge capability parameter of the battery pack; and
a second tool host adapted to couple with the battery pack, comprising:
a second tool controller configured to:
communicate with the battery pack controller and transmit data of the voltage of the plurality of cells and/or the voltage of the battery pack and data of the maximum discharge current; and
control the current of the motor based on the maximum discharge current and the voltage of the plurality of cells and/or the voltage of the battery pack.

14. The power tool system according to claim 13, wherein the battery pack further comprises a timer configured to activate the controller to correct a remaining capacity of the battery pack at a preset moment after the battery pack has been charged.

15. The power tool system according to claim 13, wherein the battery pack further comprises a wireless communication module configured to wirelessly transfer data stored in the memory.

16. The power tool system according to claim 13, wherein the battery pack further comprises a safety switch, disposed between a battery pack positive terminal and the battery pack, configured to turn on or turn off the connection between the battery pack positive terminal and the plurality of cells under the control of the controller.

17. The power tool system according to claim 13, wherein the battery pack further comprises a current sensing resistor configured to detect a current passing through the plurality of cells.

\* \* \* \* \*